(12) United States Patent
Riley et al.

(10) Patent No.: US 6,307,972 B1
(45) Date of Patent: Oct. 23, 2001

(54) METHOD AND APPARATUS FOR GENERATING A BITMAP

(75) Inventors: Andrew James Riley, Bedfordshire; Martin Philip Gouch, Herts, both of (GB)

(73) Assignee: Fujifilm Electronic Imaging Ltd, Herts (GB)

( * ) Notice: Subject to any disclaimer, the term of this patent is extended or adjusted under 35 U.S.C. 154(b) by 0 days.

(21) Appl. No.: 09/084,467

(22) Filed: May 26, 1998

(30) Foreign Application Priority Data

May 30, 1997 (GB) .................................................. 9711202

(51) Int. Cl.$^7$ ................................ G06K 9/36; G06K 9/46
(52) U.S. Cl. ............................ 382/237; 358/455; 358/456
(58) Field of Search ................................... 382/237, 205; 358/455, 456, 457, 458, 534, 535, 536, 298, 1.9

(56) References Cited

U.S. PATENT DOCUMENTS

| | | | |
|---|---|---|---|
| 4,456,924 | 6/1984 | Rosenfeld | 358/75 |
| 5,587,811 | * 12/1996 | Liguori | 358/456 |
| 5,619,591 | * 4/1997 | Tsang et al. | 382/237 |
| 5,764,804 | * 6/1998 | Yajima et al. | 382/238 |

FOREIGN PATENT DOCUMENTS

| | | |
|---|---|---|
| 0 481 812 A2 | 4/1992 | (EP) . |
| WO 96/16380 | 5/1996 | (WO) . |

* cited by examiner

*Primary Examiner*—Thomas D. Lee
(74) *Attorney, Agent, or Firm*—Sughrue, Mion, Zinn, Macpeak & Seas, PLLC

(57) ABSTRACT

A method of generating a bitmap representative of an original image. The method comprises (1) scanning the original image to generate a greyscale pixel map; (2) interpolating and rotating the greyscale pixel map to generate a higher resolution greyscale pixel map; and (3) converting the higher resolution greyscale pixel map into the bitmap. The greyscale pixel map is converted into the bitmap by (I) ranking each greyscale pixel value against the greyscale pixel values of a neighborhood of adjacent pixel locations; (ii) determining a desired number of black binary pixels (B_Pc) in the neighborhood; (iii) comparing the rank of the greyscale pixel with the desired number of black binary pixels; and (iv) assigning a black binary pixel value to the pixel location when the comparison carried out in step (iii) satisfies a predetermined condition.

5 Claims, 9 Drawing Sheets

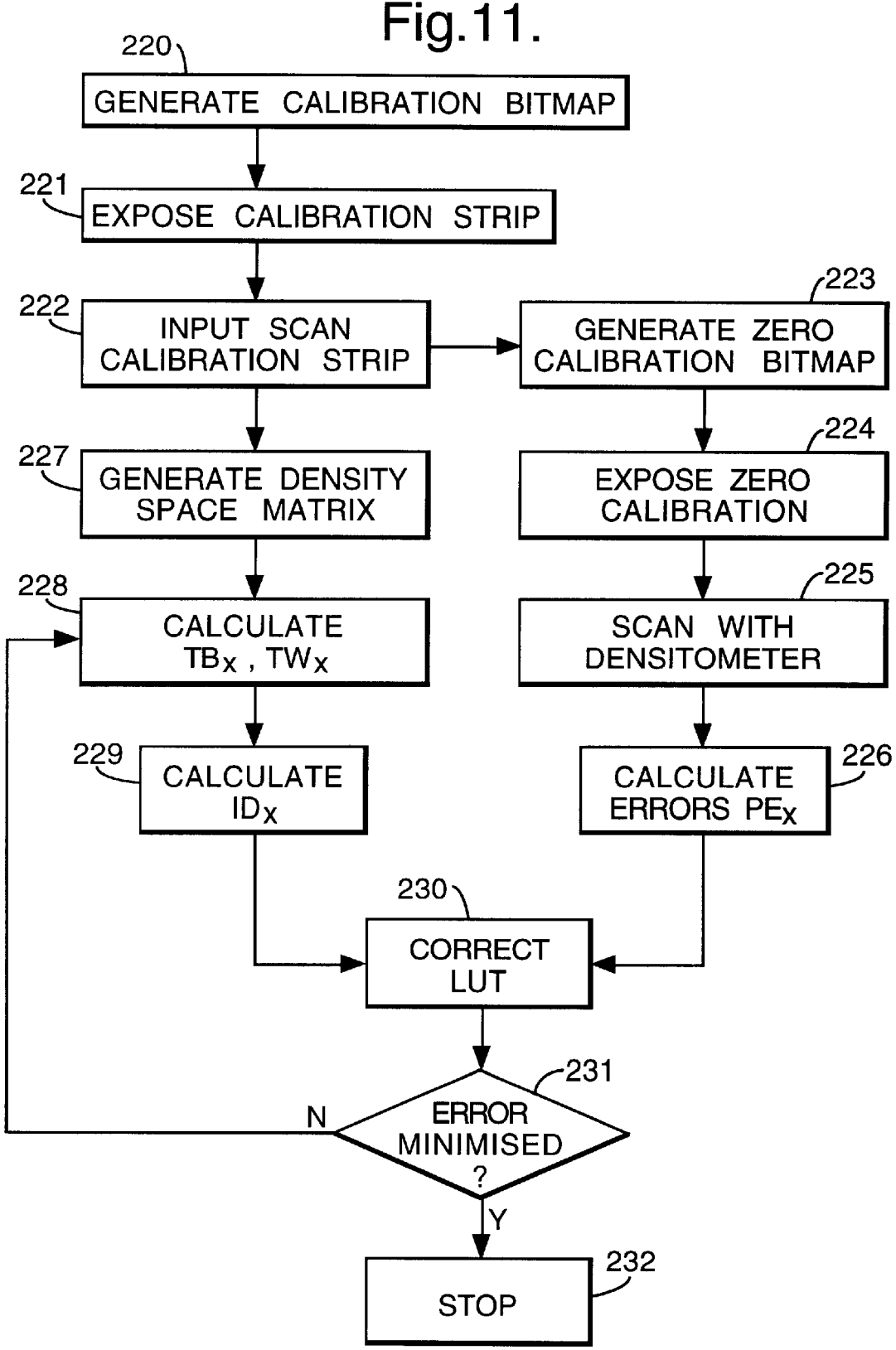

TYPICAL FILM SEPARATION WHEN VIEWED AT HIGH ENLARGEMENT

METHOD AND APPARATUS FOR GENERATING A BITMAP

FIELD OF THE INVENTION

The present invention relates to a method and apparatus for generating a bitmap which is representative of an original image such as a film separation.

DESCRIPTION OF THE PRIOR ART

Input scanners conventionally sample an original image (such as a continuous tone image or a film separation) and generate a bitmap suitable for output to a bi-level printing device.

A problem with known input scanners is that they can take a significant amount of time to scan the original image at the resolution required by the bi-level printing device.

SUMMARY OF THE INVENTION

In accordance with a first aspect of the present invention there is provided a method of generating a bitmap representative of an original image, the method comprising (1) scanning the original image to generate a greyscale pixel map comprising a plurality of greyscale pixel values by;
  (i) directing a light beam onto the original image whereby the light beam is modulated by the image to generate a modulated light beam;
  (ii) causing relative scanning movement between the light beam and the original image;
  (iii) detecting the modulated light beam to generate a picture signal; and
  (iv) generating the plurality of greyscale pixel values from the picture signal;
(2) interpolating the greyscale pixel map to generate a higher resolution greyscale pixel map; and
(3) converting the higher resolution greyscale pixel map into the bitmap.

The method enables an original image to be scanned more quickly and reduces the amount of image data which needs to be processed.

The interpolation may comprise a linear 2-point interpolation. However preferably the interpolation comprises a 4-point interpolation which provides a small amount of sharpening of the image. In a further alternative, an interpolation algorithm having an order greater than 4 could be used, which in some cases may improve image quality.

Conventional input scanners may be used to scan film separations, ie. films which carry information on a particular colour component of an image. Typically four film separations need to be scanned for each image, each corresponding to one of the four conventional printing colours cyan, magenta yellow or black (CMYK). It is important for the scanned images to be in register. Conventionally this is achieved by manually rotating the film separations on the scanner cylinder. This is inaccurate and time consuming.

In accordance with a second aspect of the present invention there is provided a method of producing an output image from a plurality of colour separations comprising (1) scanning each colour separation to generate a respective plurality of greyscale pixel maps;
(2) rotating one or more of the greyscale pixel maps to correct any misregistration between the colour separations;
(3) converting each greyscale pixel map into a respective bitmap; and
(4) producing the output image by superimposing the bitmaps.

The second aspect of the present invention enables the bitmaps to be accurately and easily registered with each other. It has been appreciated that if the bitmap (as opposed to the greyscale pixel map) is rotated this can result in systematic errors which are visible in the final image. By rotating the greyscale pixel map these errors are minimised.

In a preferable embodiment the methods of the first and second aspects of the present invention are combined. The interpolation and rotation may be carried out sequentially but preferably the greyscale pixel map is rotated and interpolated in a single composite transformation. This reduces the amount of computation required.

In a preferable embodiment the original image is a screened image such as a film separation. Scanning such an original image is known conventionally as "copy dot scanning" in which an original screened image comprising a number of (typically bi-level) dots is scanned. The film separations have typically been previously created by a conventional digital halftoning technique. That is, the separations are created by scanning an original continuous tone image to generate cyan, magenta, yellow and black greyscale representations of the image, converting the greyscale representations into binary form suitable for printing, and printing the bitmap on film. The film separations are conventionally known as binary screened images since they are binary images which have been created by sampling an original image using a screen.

A film separation can be modelled as a digital black and white bitmap. That is, film separations when examined at high magnification can be seen to be a regular grid of black dots on a clear background. FIG. 13 illustrates a magnified portion of a film separation along with its associated screen grid. The magnified portion contains three half-tone dots 100–102 on a screen grid 104. Ideally the grid 104 would be scanned at exactly the resolution at which it was produced, and in register, so that the sampled pixel locations are centred on the original pixel locations. However due to inaccuracies in generating the original, film stretch during processing or handling, and problems matching the input scanner screen grid with the screen grid 104 this ideal is impossible to achieve. This problem is illustrated in FIG. 14 which illustrates the sampling of the dot 100 using an offset sampling grid 105. The greyscale representation of the dot 100 is illustrated at 106, where the numbers illustrate the percentage density at each sampling point. Conventional techniques then convert the greyscale representation of the dot using thresholding techniques. If the threshold is set at 50% then the bitmap representation of the dot is illustrated at 107. If the threshold is set at 40%, then the bitmap representation will be as illustrated at 108. It can be seen that neither 107 nor 108 are accurate representations of the dot 100. This will result in tonal change—for instance where a 50% threshold is used, only four black pixels are generated and as a result the image will be lighter than required. If a 40% threshold is used, then seven black pixels are generated, which will result in the image being darker than required. Where there are few black pixels in the original there will tend to be fewer in the regenerated bitmap. Where nearly all the pixels in the original are black even more will be black in the regenerated bitmap. In addition to the tonal changes there are also problems with regenerating the original cluster shapes, with the edges tending to become jagged.

In accordance with a third aspect of the present invention there is provided a method of generating a bitmap representative of an original image, the bitmap comprising a plurality of white/black binary pixel values each having a respective pixel location, the method comprising (1) scanning the original image to generate a greyscale pixel map, the greyscale pixel map comprising a plurality of greyscale pixel values each having a respective pixel location; and (2) converting the greyscale pixel map into the bitmap by
   (i) ranking each greyscale pixel value against the greyscale pixel values of a neighbourhood of adjacent pixel locations;
   (ii) determining a desired number of black binary pixels (B_Pc) in the neighbourhood;
   (iii) comparing the rank of the greyscale pixel with the desired number of black binary pixels; and
   (iv) assigning a black binary pixel value to the pixel location when the comparison carried out in step (iii) satisfies a predetermined condition.

This method ensures that the number of black dots in the original image is accurately reproduced in the bitmap, and results in more accurate tonal reproduction. Typically a black binary pixel value is assigned to the pixel location when the rank of the greyscale pixel is greater than or equal to the desired number of black binary pixels.

It will be understood that the terms white/black are simply labels which refer to the two values (i.e. 1/0) which can be assigned to each binary pixel, and do not necessarily relate to the tonal or colour content of the image.

Typically step (ii) comprises summing the greyscale pixel value of each pixel in the neighbourhood and determining (B_Pc) from the sum (TD) in accordance with a predetermined algorithm.

In a first example the desired number of black binary pixels is determined in step (ii) in accordance with the average of the greyscale pixel values in the neighbourhood.

In a second example the desired number of black binary pixels is determined in step (ii) in accordance with the equation $$B\_Pc = \frac{2[TD - (N \cdot I\_white)]}{I\_black - I\_white}$$

where

N is the number of pixels in the neighbourhood;
B_Pc is the desired number of black binary pixels;
TD is the sum of the greyscale pixel values in the neighbourhood;
I_white is a background white level; and
I_black is a black level.

In a third example the desired number of black binary pixels in the neighbourhood is determined using a look-up table (LUT) loaded with the predetermined algorithm. TD (the sum of the greyscale pixel values in the neighbourhood) is input into the LUT, which is loaded with a black-count corresponding with every possible input TD. Typically the LUT is previously calibrated, for instance by scanning a calibration strip containing a range of patches, each patch having a respective different density. This generates a calibration greyscale pixel map which is input to the LUT, and the output of the LUT is compared with a desired output. The error in the output of the LUT can then be minimised, for instance by iteration of the LUT.

In a preferable embodiment the method of the third aspect of the present invention is combined with the methods according to the first and/or second aspects of the present invention.

In accordance with a fourth aspect of the present invention there is provided apparatus for generating a bitmap representative of an original image, the apparatus comprising (1) an input scanner for scanning the original image to generate a greyscale pixel map comprising a plurality of greyscale pixel values, the input scanner comprising;
   (i) means for directing a light beam onto the original image whereby the light beam is modulated by the image to generate a modulated light beam;
   (ii) means for causing relative scanning movement between the light beam and the original image;
   (iii) a detector for detecting the modulated light beam to generate a picture signal; and
   (iv) means for generating the plurality of greyscale pixel values from the picture signal;

(2) means for interpolating the greyscale pixel map to generate a higher resolution greyscale pixel map; and (3) means for converting the higher resolution greyscale pixel map into the bitmap.

In accordance with a fifth aspect of the present invention there is provided apparatus for producing an output image from a plurality of colour separations comprising (1) means for scanning each colour separation to generate a respective plurality of greyscale pixel maps;

(2) means for rotating one or more of the greyscale pixel maps to correct any misregistration between the colour separations;

(3) means for converting each greyscale pixel map into a respective bitmap; and (4) means for producing the output image by superimposing the bitmaps.

The degree of rotation may be set manually.

Alternatively the apparatus may further comprise means for detecting a plurality of registration marks in each greyscale pixel map; means for determining a rotation value from the locations of the detected registration marks; and means for rotating one or more of the greyscale pixel maps by the rotation value.

In accordance with a sixth aspect of the present invention there is provided apparatus for generating a bitmap representative of an original image, the bitmap comprising a plurality of binary pixel values each having a respective pixel location, the apparatus comprising (1) means for scanning the original image to generate a greyscale pixel map, the greyscale pixel map comprising a plurality of greyscale pixel values each having a respective pixel location; and (2) means for converting the greyscale pixel map into the bitmap by
   (i) ranking each greyscale pixel value against the greyscale pixel values of a neighbourhood of adjacent pixel locations;
   (ii) determining a desired number of black binary pixels in the neighbourhood;
   (iii) comparing the rank of the greyscale pixel with the desired number of black binary pixels; and
   (iv) assigning a black binary pixel value to the pixel location when the comparison carried out in step (iii) satisfies a predetermined condition.

BRIEF DESCRIPTION OF THE DRAWINGS

An embodiment of the present invention will now be described and contrasted with the prior art with reference to the accompanying Figures, in which:

FIGS. 4–7 are screen grids illustrating a resize and rotate operation, in which;

FIG. 4 illustrates part of a low resolution pixel map;

FIG. 5 illustrates the pixel map of FIG. 4 with part of a rotated screen grid illustrated in dashed lines;

FIG. 6 illustrates a rotated screen grid at twice the resolution with horizontal interpolated pixel points; and FIG. 7 illustrates the rotated screen grid with interpolated horizontal and vertical pixel points;

FIG. 11 is a flow diagram showing the calibration process;

EMBODIMENT

Figure 1:
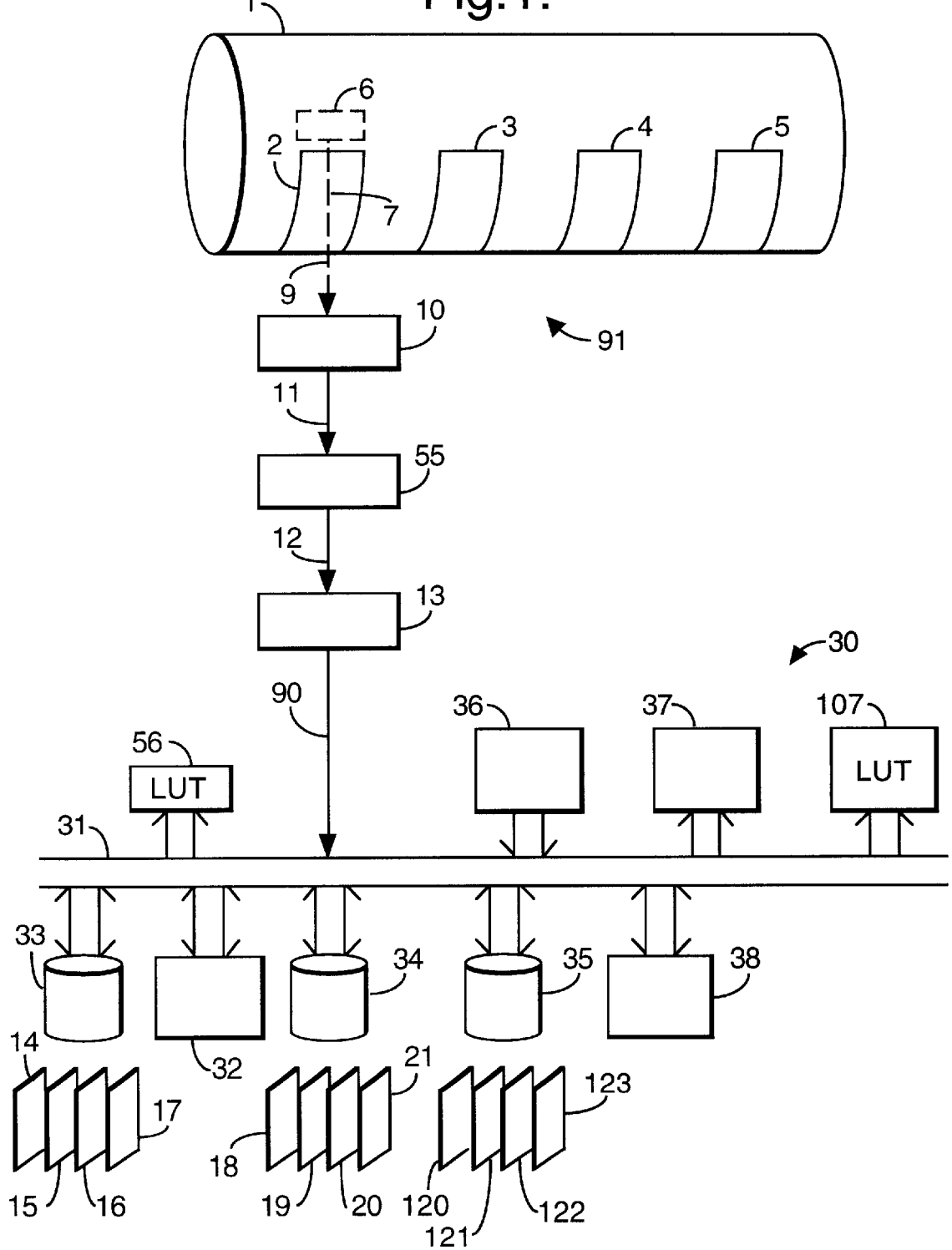
FIG. 1 is a schematic diagram of an example of an input scanner and copy dot processor.

FIG. 1 is a schematic illustration of an input scanner 91 (which electronically samples original images) connected to an associated copy dot processing system 30. A transparent drum 1 has the original images mounted on its outer surface. In the example of FIG. 1, four film separations 2–5 are mounted on the cylinder 1. Each separation 2–5 carries a black and white printed image which represents the cyan, magenta, yellow or black colour density component of a colour image.

A white light source 6 inside the cylinder 1 generates a light beam 7 which passes through the drum 1 illuminating part of one of the film separations. The modulated beam 9 is received by radiation sensor 10. In order to scan the whole cylinder 1, the cylinder rotates and the light source 6 and radiation sensor 10 move parallel to the axis of the cylinder 1. The radiation sensor 10 generates a logarithmic signal 11 which is proportional to the logarithm of the intensity of the modulated light beam 9. Converter 55 takes the exponential of the logarithmic signal 11 to generate a signal 12 which is proportional to the intensity of the modulated light beam 9 and hence proportional to the density of the film separation. Analogue-to-digital converter 13 converts the signal 12 into a digital greyscale signal 90 comprising a sequence of 0–255 greyscale pixel values representing the density of the images on the scanner cylinder 1 with a screen grid at a resolution of 50 lines per mm.

The greyscale signal 90 is input to a copy dot processing system 30 which is described below.

System bus 31 is connected to microprocessor 32 which controls the overall process flow. The greyscale signal 90 is saved in low resolution greyscale image store 33. A resize/register system 38 carries out resizing and registration operations on the greyscale images. High resolution greyscale image store 34 stores high resolution greyscale images and bitmap image store 35 stores the final output of the system, i.e. bitmaps. An input device 36 and monitor 37 are also connected to the system bus 31 for operator input.

Figure 2:
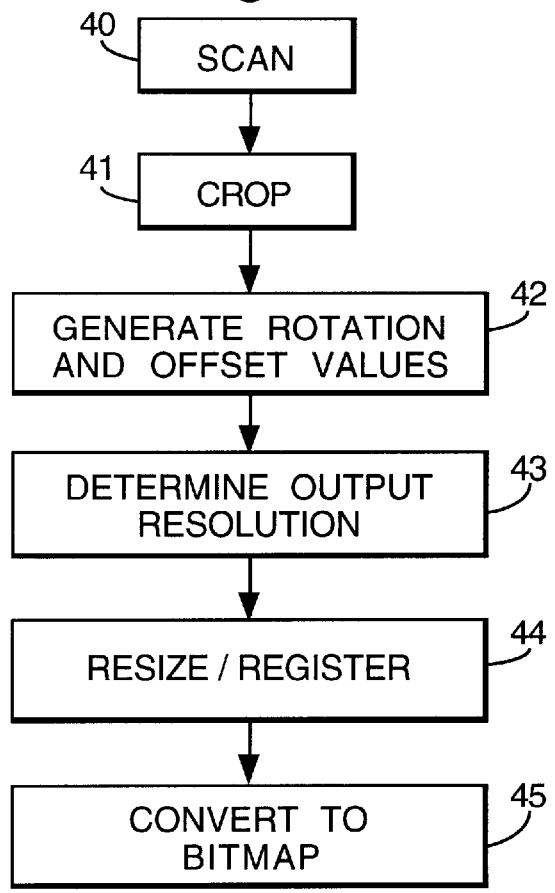
FIG. 2 is a flow diagram illustrating a method of generating a bitmap from a film separation using the system of FIG. 1.

Referring to FIG. 2, in a first step 40 the cylinder 1 is scanned to generate a greyscale pixel map of the entire cylinder 1 at a resolution of 50 lines per mm. The portions of the pixel map corresponding to the four film separations are then extracted from the pixel map at 41 (a process known as "cropping") to generate four separate low resolution greyscale pixel maps 14–17, each corresponding to a respective film separation. The four greyscale pixel maps 14–17 are stored in low resolution greyscale store 33.

In a third step 42, the system analyses the greyscale pixel maps 14–17 to determine whether there is any misregistration between the respective images. The misregistration can be determined automatically or manually as described below.

Figure 3:
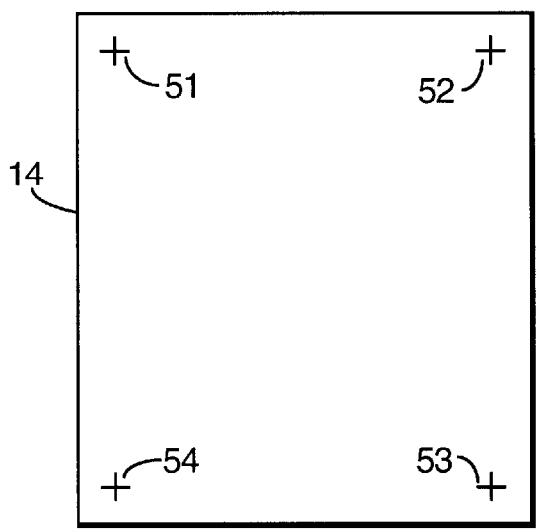
FIG. 3 illustrates the registration marks on a greyscale pixel map.

FIG. 3 illustrates one of the greyscale pixel maps 14. Each film separation 2–5 carries registration marks 51–54 which in this example are crosses. In the manual process, a user views each greyscale pixel map 14–17 on monitor 37 and points to at least two of the register marks 51–54 on each map using input device 36. The microprocessor 32 automatically locates a particular feature of each selected registration mark, for instance the centre of the cross. The locations of the two selected register marks are then used to determine the rotation values θ and offset values which will be required for each of the four greyscale pixel maps 14–17 to be precisely in register.

Alternatively the rotation and offset values may be determined automatically by a process of image recognition, in which the microprocessor 32 analyses the entire greyscale pixel maps 14–17 to locate the registration marks.

In a fourth step 43, the system determines the required output resolution, i.e. the resolution of the bitmap which is stored in bitmap store 35. This can be determined by user input via input device 36, or may be determined automatically. In the example described below the output resolution is 100 lines per mm.

In a fifth step 44, the system carries out a resize/register operation on greyscale pixel maps 14–17 as described below.

Figure 4:
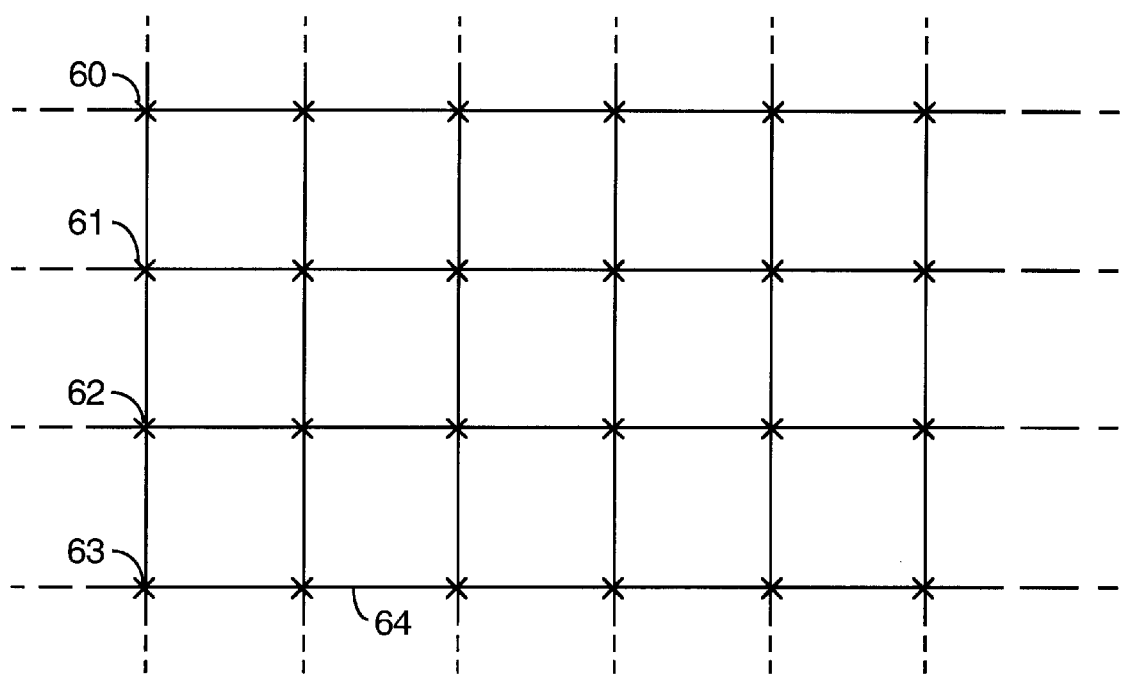
Figure 5:
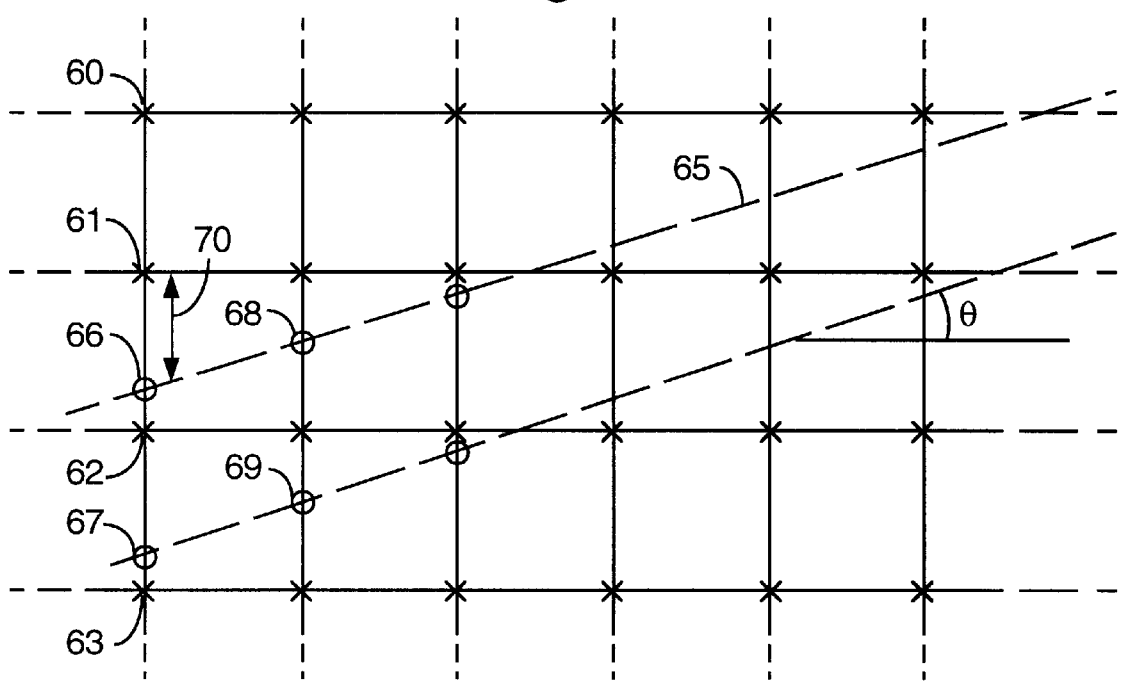

FIG. 4 illustrates part of one of the greyscale pixel maps 14–17 and its associated screen grid. The pixel map comprises a number of pixel values which each represent colour density at a respective pixel location 60–63 etc. on a rectangular screen grid 64. The screen grid 64 has a resolution of fifty lines per mm. As illustrated in FIG. 5, the resize/register system 38 first generates a rotated screen grid 65 at the required angle θ. The system 33 then carries out a four-point interpolation process to generate pixel values at rotated pixel locations 66–69 etc. which lie at the intersection points of the rotated screen grid 65 with the original rectangular screen grid 64. For instance the pixel at location 66 is generated by four point interpolation from the four vertically arranged original pixel points 60–63.

The four point interpolation is carried out in accordance with the formula:

$$R = \sum_{i=1}^{4} c_i v_i$$

where

R is the interpolated pixel value v is the original pixel value and c is a weighting coefficient.

The weighting coefficient c is determined with reference to a look-up table 56 which contains a table of cubic coefficients. The inputs to the look-up table are the value i and the distance 70 between the pixel location 66 and the second original pixel location 61.

Figure 6:
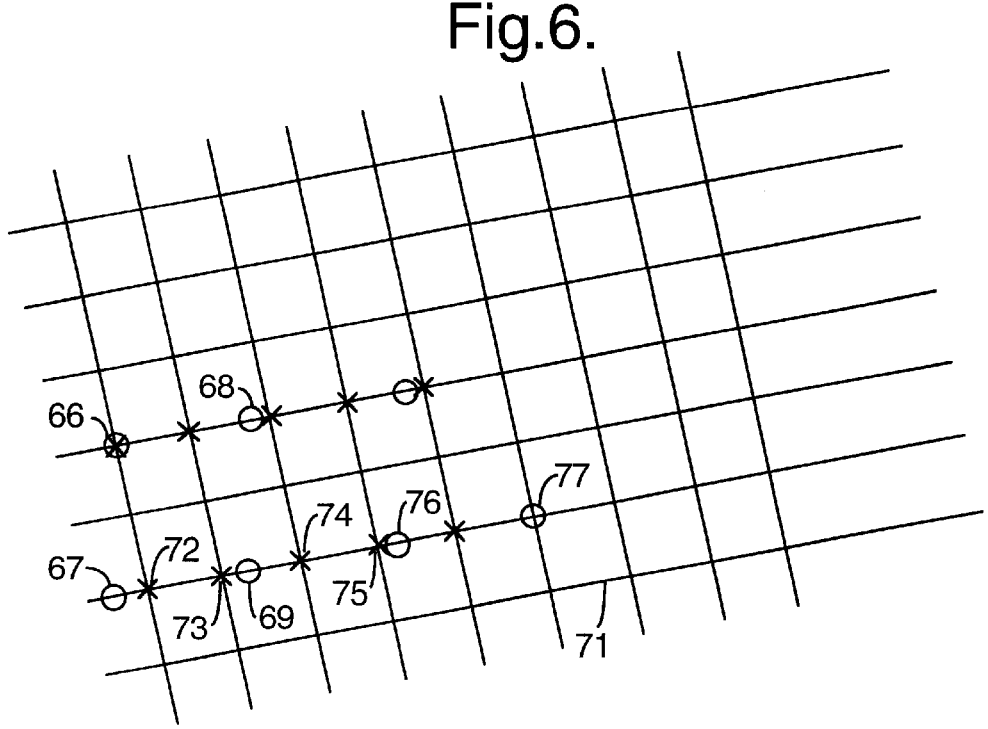

FIG. 6 illustrates a rotated screen grid 71 at twice the resolution of the rotated screen grid 65. A high resolution rotated pixel map is generated by first carrying out a 4-point interpolation along rows of the screen grid 65 to generate pixel values at locations 72–75 etc. For instance the pixel value at location 74 is calculated by carrying out 4-point interpolation from the pixel values at locations 67,69,76,77.

Figure 7:
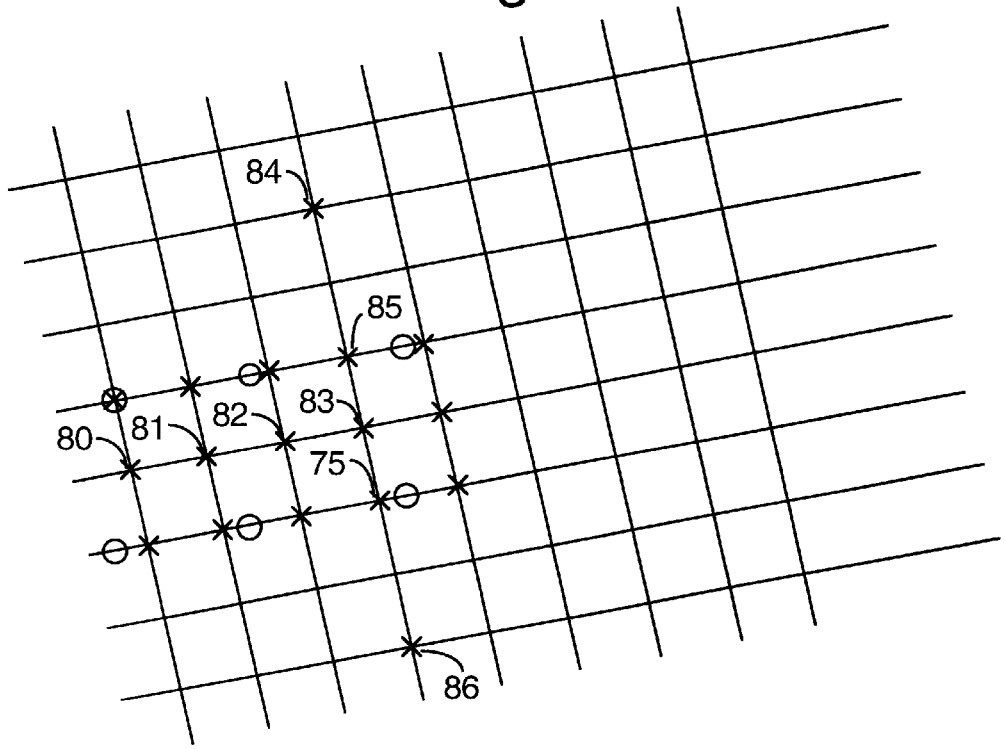

As illustrated in FIG. 7, the remaining pixel values at pixel locations 80–83 etc. are determined by 4-point interpolation along columns of the high resolution screen grid 71. For instance the pixel value at pixel location 83 is calculated by four point interpolation from the adjacent four pixels at locations 75,84–86.

The output of the process illustrated in FIGS. 4–7 is a set of four high resolution rotated greyscale pixel maps 18–21 which are stored in high resolution greyscale image store 34.

In a final step 45 the four greyscale pixel maps 18–21 are converted into bitmap form. The method of converting the greyscale pixel maps 18–21 is illustrated in detail in FIG. 8.

For each pixel location a binary value is calculated in the following loop:

Step 101. The next pixel is selected.

Step 102. If there are no more pixels, then the loop is terminated at step 103.

Step 104. The density of the centre pixel is ranked against the density of its 24 nearest neighbours as follows:

$$RANK = \sum_{p=1}^{p=24} GE[D_{cp} - D_p]$$

where:

RANK is the pixel rank;

p is a pixel number;

$D_{cp}$ is the density of the centre pixel;

$D_p$ is the density of the $P_{th}$ neighbouring pixel; and $GE[D_{cp}-D_p]$ is the output of a look-up table which is programmed as shown in Table 1:

TABLE 1

| $D_{cp}$ - $D_p$ | GE [$D_{cp}$ - $D_p$] |
|---|---|
| 255 | 2 |
| . | . |
| . | . |
| . | . |
| 2 | 2 |
| 1 | 2 |
| 0 | 1 |
| -1 | 0 |
| -2 | 0 |
| . | . |
| . | . |
| -255 | 0 |

This look-up table adds 2 for every neighbouring pixel that has a density that is lower than the centre pixel. It also adds 1 for each pixel of equal density.

Step 105. The centre pixel value and the 24 neighbouring centre pixels are summed to produce a total density $$TD = \sum_{p=0}^{p=24} D_p$$

Step 106. The total density value TD is input to a black pixel look-up table 107 (FIG. 1). The output of the black pixel look-up table 107 is a black pixel count B_Pc.

Step 108. If RANK>=50–B_Pc then the centre pixel is designated as a black pixel at step 109.

Step 110. If RANK<50–(B_Pc+1) then the centre pixel is designated as a white pixel at step 111.

Step 112. If RANK=50–(B_Pc+1) then a random number R (between 0 and 1) is generated.

Step 113. If R is greater than 0.5 then the centre pixel density $D_{cp}$ is decremented to break the equality (step 115) and the centre pixel is designated as a white pixel at 111. If R is less than 0.5 then the centre pixel density $D_{cp}$ is incremented and the centre pixel is designated as a black pixel at step 109.

Figure 8:
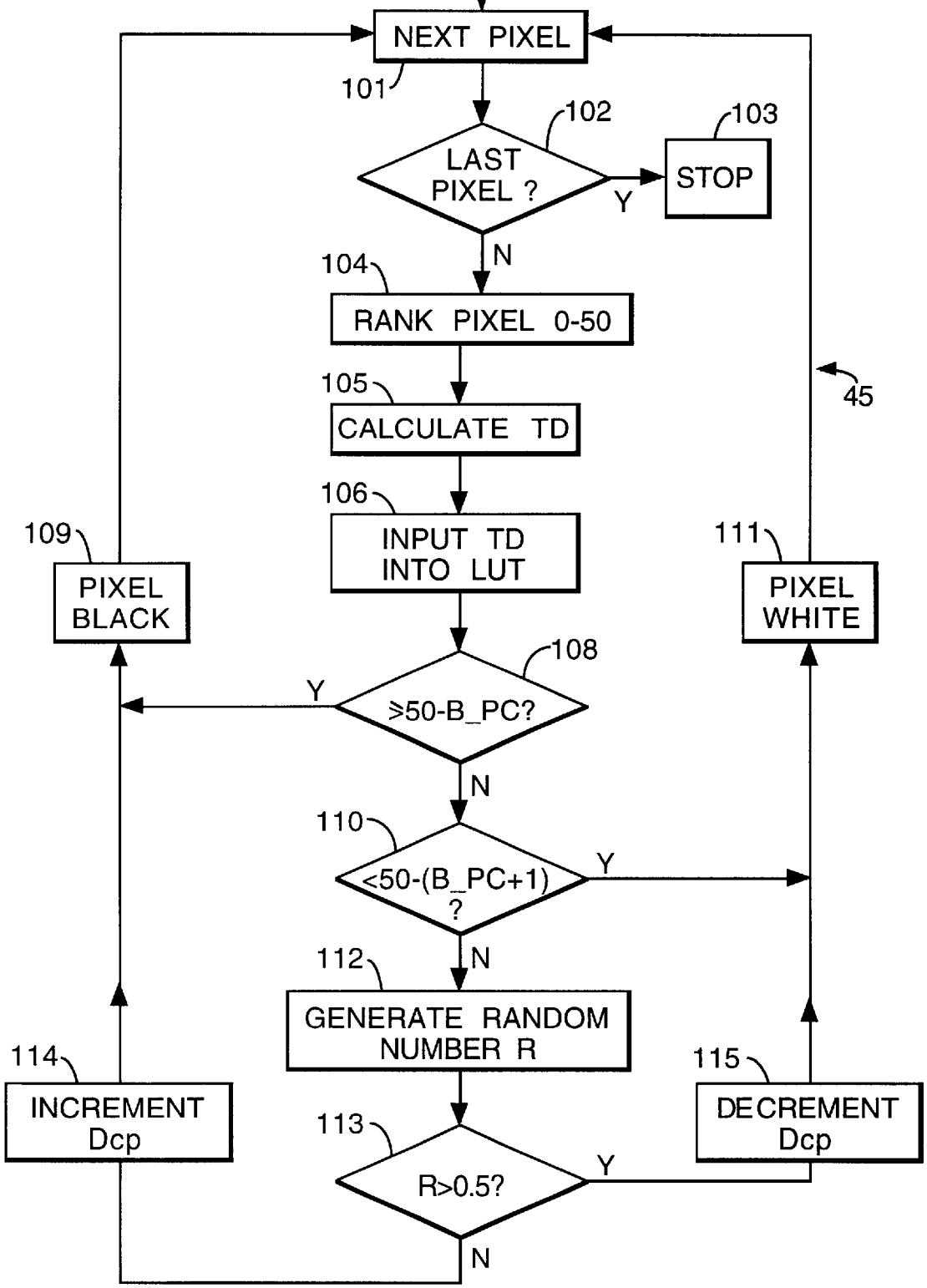
FIG. 8 is a flow diagram illustrating an example of a method of assigning a binary pixel value to each pixel location.

The method illustrated in FIG. 8 uses a neighbourhood comprising a 5*5 square of pixels but any suitable neighbourhood may be chosen, for instance a 3*3 or 4*4 square of pixels.

The process illustrated in FIG. 8 generates four bitmaps 120–123 which are stored in bitmap store 35. The bitmaps 120–123 can then be displayed on monitor 37.

The black pixel look-up table 107 may be linear (i.e. with the output B_Pc being proportional to the input TD). However preferably the black pixel look-up table 107 is calibrated as discussed below with reference to FIGS. 9 to 12.

Figure 9:
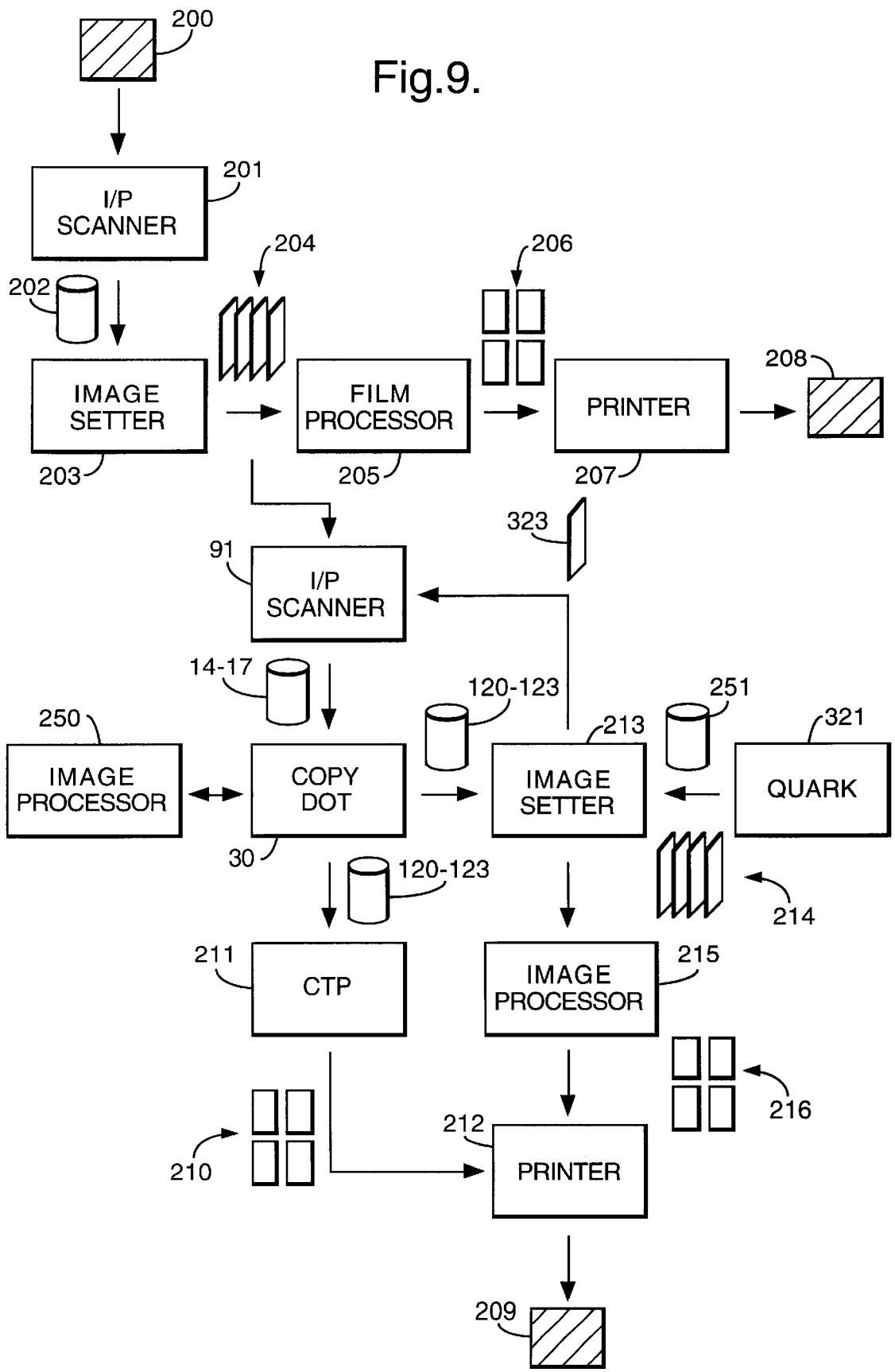
FIG. 9 is a schematic diagram of an imaging system incorporating the system of FIG. 1.
Figure 10:
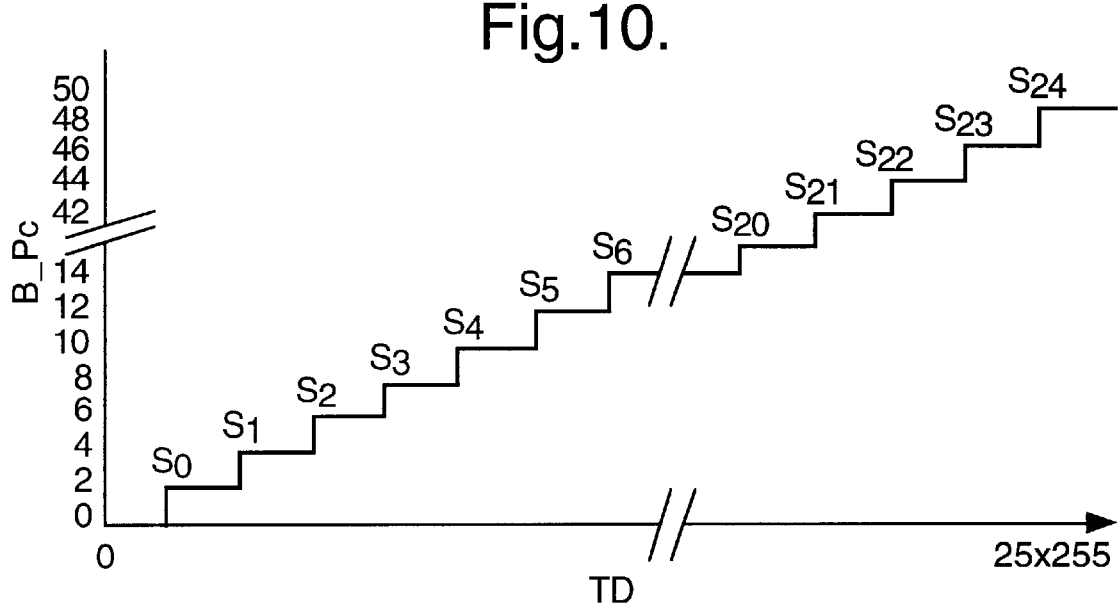
FIG. 10 illustrates the black pixel count look-up table.

FIG. 9 is a schematic illustration of an imaging system incorporating the input scanner 91 and copy dot processing system 30 illustrated in FIG. 1. An original image 200 (such as a continuous tone colour print or transparency) is scanned into an input scanner 201 which generates a set of greyscale image files 202. The image files 202 are input to an imagesetter 203. The imagesetter 203 converts the greyscale image files 202 into bit map form and prints a set of film separations 204 in accordance with the calculated bit maps.

The separations 204 can then be directly printed by mounting them on a film processor 205 which generates a set of printing plates 206 and mounting the printing plates 206 on a printer 207 which produces a colour print 208. The colour print 208 is a direct copy of the original 200. The bitmap processor in the imagesetter 203 is previously calibrated in a known manner to account for errors in the imagesetting process.

Alternatively the transparency 204 may be converted into bit map form by a method according to the present invention using a different input scanner 91 and an associated copy dot processor 30.

The input scanner 91 generates a set of greyscale image files 14–17 (as discussed previously with reference to FIG. 1) which are processed by copy dot processor 30 to generate a set of high resolution bitmap files 120–123. The greyscale image files 14–17 or bitmap files 120–123 may also be modified by an image processor 250. For instance the image processor 250 may perform colour correction or may merge the image with previously stored images.

The bitmap files 120–123 can be used to generate a colour print 209 in two alternative ways.

In a first alternative, the bitmaps 120–123 are converted directly into a set of printing plates 210 by a copy-to-plate (CTP) processor 211. The plates 210 are then mounted on a printer 212 which prints the colour print 209.

In a second alternative, the bitmaps 120–123 are input to an imagesetter 213 which generates a set of separations 214. The separations 214 are mounted on a film processor 215 which generates a set of printing plates 216. The printing plates 216 are then mounted on a printer 212 which prints the colour print 209.

Because the imagesetter 213 will have different dot growth and shrinkage characteristics to the imagesetter 203 which was used to generate the separations 204, the separations 214 will not accurately reproduce the separations 204 without additional calibration of the copydot processing system 30. The calibration method is discussed below.

Calibration is achieved by altering the programming of the black pixel count look-up table 107. In its default "zero calibration" setting, the pixel count look-up table 207 has the form illustrated in FIG. 10. The input to the look-up table (TD) has a value between 0 and 25×255. The output of the look-up table (B_Pc) varies in steps of 2 between 0 and 50. In its zero calibration configuration, each step $S_0$–$S_{24}$ is equally spaced.

Referring to FIG. 11, in a first step 220 of the calibration process a calibration image is generated by quark image generation software 321 (FIG. 9) and saved as a bitmap 251. The calibration bit map 251 comprises a matrix of 29 patches, each patch having a required internal density $R\_D_x$ between 0 and 100% as set out below in Table 2.

TABLE 2

| X | $R\_D_x$ |
|---|---|
| 1 | 0 |
| 2 | 1 |
| 3 | 2 |
| 4 | 3 |
| 5 | 4 |
| 6 | 5 |
| 7 | 10 |
| 8 | 15 |
| 9 | 20 |
| . | . |
| . | . |
| . | . |
| 21 | 80 |
| 22 | 85 |
| 23 | 90 |
| 24 | 95 |
| 25 | 96 |
| 26 | 97 |
| 27 | 98 |
| 28 | 99 |
| 29 | 100 |

The bitmap 251 is input to imagesetter 213 in step 221, which prints a calibration strip 323 (FIG. 9).

The calibration strip 323 is then mounted on input scanner 91 in step 222 and the greyscale image files 14–17 are input to the copydot processor 30. The copy dot processor 30 generates a zero calibration bitmap in step 223 using the black pixel count look-up table 107 in its "zero calibration" setting. The zero calibration bit map is then exposed using imagesetter 213 in step 224. The "zero calibration" film strip generated in step 224 is then scanned with a densitometer in step 225. In order to speed up the densitometer scanning process, only nine of the patches (e.g. with densities of 10, 20, 30, 40, 50, 60, 70, 80 and 90%) are measured. The measured density values $M\_D_x$ for the nine measured patches are then stored and a fourth power quadratic is fitted to the nine measured values to generate approximate values for all 29 patches. This saves operator time in the measurement process.

In step 226 the percentage error in each patch $PE_x$ is calculated as $$PE_x = \frac{R\_D_x}{M\_D_x}$$

Meanwhile, the copydot processor 30 generates a density space image in step 227 from the greyscale version of the calibration strip as follows. The density space matrix is a 6375×48 matrix with the matrix row given by the total density TD of each pixel (i.e. the sum of the densities of the pixel and its 24 neighbours) and with the column of the matrix given by the RANK value of each pixel. For each pixel in the calibration strip bitmap, the total density and rank of the pixel is calculated, giving a position in the density space matrix. The value of that position in the matrix is then incremented. When the entire image has been processed to generate a density space matrix, the matrix can be used to calculate the total number of black pixels $TB_x$ and the total number of white pixels $TW_x$ in each patch. This is done by passing the density space matrix through the black pixel count look-up table 107. For each row in the density space matrix (corresponding with a particular TD) a black pixel count is output from the black pixel count look-up table 207. The values of that row having a rank greater than the black pixel count are then summed to give the total black value $TB_x$, and the values having a rank lower than the black pixel count are summed to give the total white value $TW_x$.

This is carried out in step 228. In step 229, an internal density value $ID_x$ is calculated as follows:

$$ID_x = \frac{TB_x}{TW_x + TB_x}$$

We now have an internal density for the zero calibration setting $ID_x^{(zc)}$ and an error $PE_x$ for each patch.

We then derive a target internal density $T\_ID_x$ where $$T\_ID_x = PE_x * ID_x^{zc}$$

which we believe is equivalent to the required density.

All that remains is to iterate the black pixel count look-up table 107 such that the internal densities (new$ID_x$) obtained when the density space matrix is passed through the look-up table 107 match the target densities $T\_ID_x$ for all patches, i.e.:

$$\sum_{x=1}^{x=29} (T\_ID_x - \text{new } ID_x)^2 \text{ is minimised.}$$

The iteration procedure is as follows

When all the steps $S_0$–$S_{24}$ are in their default "zero calibration" position, and the density space image is processed using the look-up table 107, the resulting "internal" densities for the 29 calibration patches are given by $$ID_x^{(zc)}$$

In a first iteration, step $S_0$ is moved by $\Delta d$ and the density space image again processed to give:

$$ID_x^{(zc+S_0 \Delta d)}$$

from which we can derive:

$$\Delta ID_x^{(S_0 \Delta d)} = ID_x^{(zc)} - ID_x^{(zc+S_0 \Delta d)}$$

where $$\Delta ID_x^{(S_0 \Delta d)}$$

is the change in $ID_x$ following a change of $\Delta d$ in the position of step $S_0$ in the look-up table 107.

$S_0$ is then moved back to its zero calibration position and $S_1$ moved by $$\Delta d \rightarrow ID_x^{(zc+s_1\Delta d)} \rightarrow \Delta ID_x^{s_1\Delta d}$$

This is repeated for all 25 steps keeping a record of all $$\Delta ID_x^{S_0\Delta d}$$

We then make the assumption that these are linear with respect to the magnitude of "$\Delta d$" and are additive with respect to each other.

It can be shown that given the above assumptions the internal density of patch x is given by:

$$\text{New } ID_x = \left( ID_x^{(zc)} + \sum_{n=0}^{n=25} \left( \Delta ID_x^{(S_0\Delta d)} * f_n \right) \right)$$

where "$f_n$" is the fraction of the change "$\Delta d$" being used at step "n". Using a least squares approach it is possible to iterate "$f_n$" to minimise the total Error E given by:

$$E = \sum_{x=0}^{x=29} \left( T\_ID_x - \left( ID_x^{(zc)} + \sum_{n=0}^{n=25} \Delta ID_x^{S_n\Delta d} f_n \right) \right)^2$$

when this iteration completes the above process is repeated using the result as a starting point (instead of zc) and a smaller $\Delta d$ (typically half the size of the original $\Delta d$) and repeated . . . until $\Delta d=4$.

At this point assumptions about additivity and linearity are no longer made and the density space image is iterated directly.

The iterative loop of steps 228–231 is repeated until the error is minimised in step 231. The process then stops at step 232.

Figure 12:
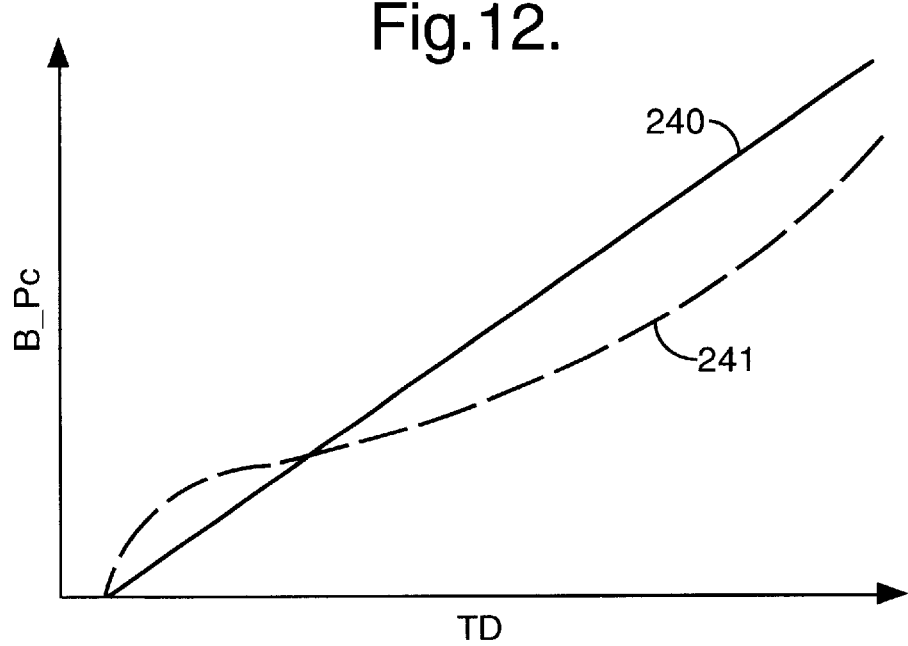
FIG. 12 illustrates the effect of calibration on the black pixel count look-up table.
Figure 13:
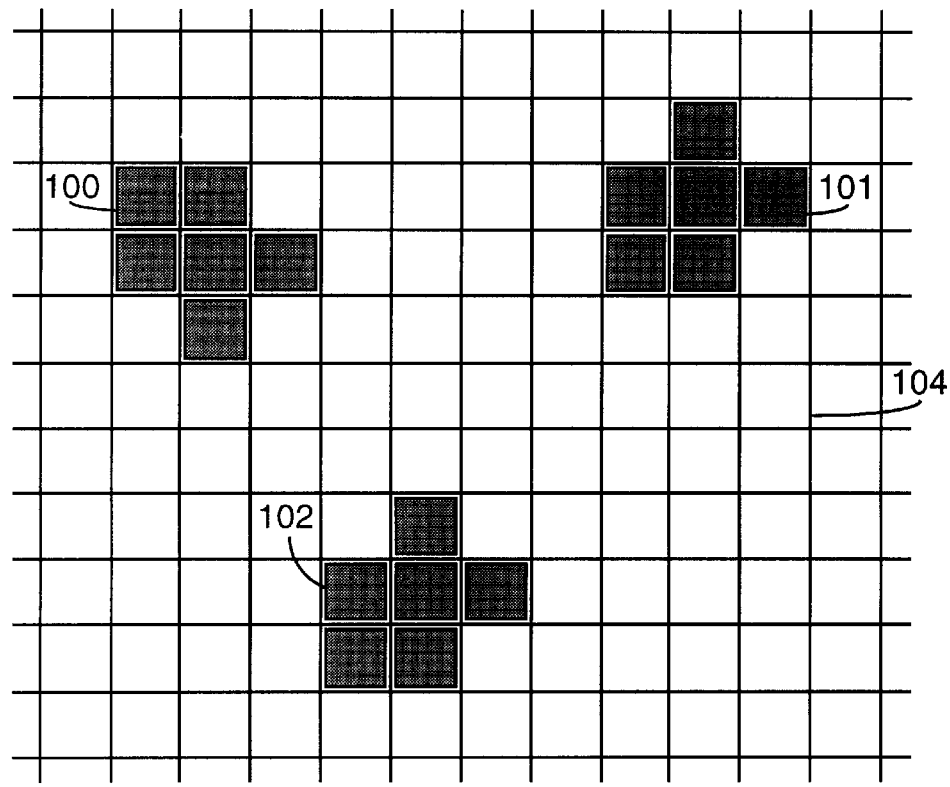
FIG. 13 illustrates part of a typical film separation when viewed at high enlargement.
Figure 14:
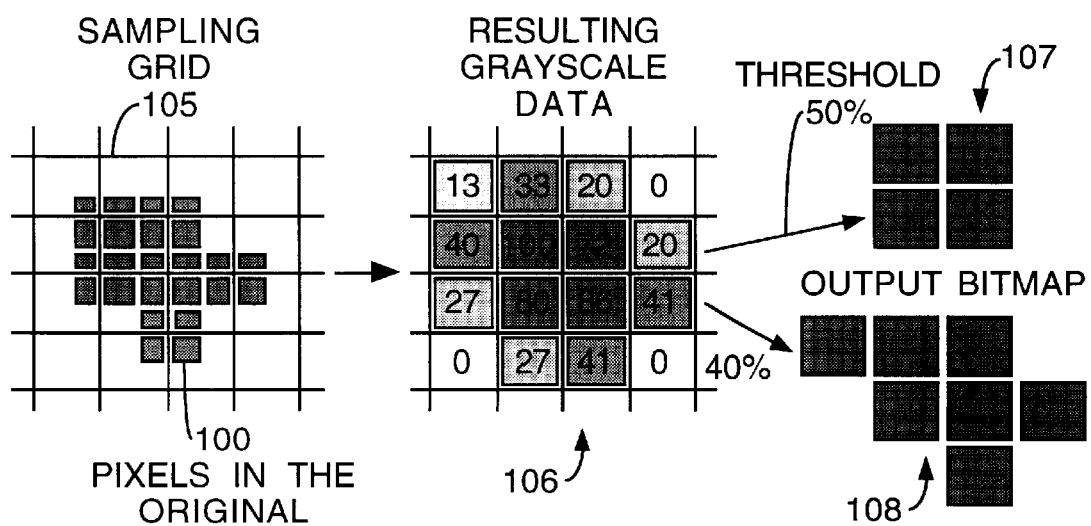
FIG. 14 illustrates the results of a conventional method of conversion of one of the dots illustrated in FIG. 13 to a bitmap.

The result of the calibration procedure is illustrated in FIG. 12. The black pixel count look-up table 107 in its zero calibration position is illustrated by the solid line 240. The calibration procedure converts the linear function 240 into a sinusoidal curve 241 (shown in dotted lines).

In an alternative method, the black pixel count is determined as follows. Before step 101 (FIG. 8) a background white level (I_white), and a black level (I_black) are determined. The white and black levels may be determined in a number of ways. In the simplest case the white and black levels are stored previously, ie. the same white and black levels are used regardless of the images on film separations 2–5. Alternatively the greyscale pixel maps 14–15 or 18–21 may be analyzed by the microprocessor 32 to enable unique white and black levels to be calculated for each separation from histogram data.

The black pixel count is then calculated as:

$$B\_Pc = \frac{2[TD - (25 \cdot I\text{-white})]}{I\_black - I\_white}$$

We claim:

1. A method of generating a bitmap representative of an original image, said bitmap comprising a plurality of white/black binary pixel values each having a respective pixel location, the method comprising (1) scanning said original image to generate a greyscale pixel map, said greyscale pixel map comprising a plurality of greyscale pixel values each having a respective pixel location; and (2) converting said greyscale pixel map into said bitmap by (i) ranking each said plurality of greyscale pixel values against the greyscale pixel values of a neighbourhood of adjacent pixel locations;

(ii) determining a desired number of black binary pixels (B_Pc) in said neighbourhood;

(iii) comparing said rank of each of said plurality of greyscale pixel values with said desired number of black binary pixels; and (iv) assigning a black binary pixel value to said pixel location when the comparison carried out in step (iii) satisfies a predetermined condition.

2. A method according to claim 1 wherein step (ii) comprises summing said greyscale pixel value of each pixel in said neighbourhood to generate a sum (TD) and determining said desired number (B_Pc) from said sum (TD) in accordance with a predetermined algorithm.

3. A method according to claim 2 wherein said desired number (B_Pc) is determined in step (ii) by inputting said sum (TD) into a look-up table, wherein said look-up table is programmed with said predetermined algorithm.

4. A method according to claim 2 further comprising calibrating said predetermined algorithm by (a) providing a calibration strip comprising one or more patches each having a known required density (R_D$_x$);

(b) generating a zero calibration bitmap representative of said calibration strip by a method according to claim 1;

(c) comparing said zero calibration bitmap with said required density R_D$_x$; and (d) calibrating said algorithm in accordance with said comparison in step (c).

5. Apparatus for generating a bitmap representative of an original image, said bitmap comprising a plurality of white/black binary pixel values each having a respective pixel location, the apparatus comprising (1) means for scanning said original image to generate a greyscale pixel map, said greyscale pixel map comprising a plurality of greyscale pixel values each having a respective pixel location; and (2) means for converting said greyscale pixel map into said bitmap by (i) ranking each of said plurality of greyscale pixel values against the greyscale pixel values of a neighbourhood of adjacent pixel locations;

(ii) determining a desired number of black binary pixels in said neighbourhood;

(iii) comparing said rank of each of said plurality of greyscale pixel values with said desired number of black binary pixels; and (iv) assigning a black binary pixel value to said pixel location when said comparison carried out in step (iii) satisfies a predetermined condition.

* * * * *